O. D. WOODRUFF.
DOUGH MIXER AND KNEADER.
APPLICATION FILED DEC. 6, 1911.

1,027,960.

Patented May 28, 1912.

Witnesses:
Louis B. Fischler
Chas. W. La Rue

Inventor:
Oliver D. Woodruff
by Wilbur M. Stone
his Attorney.

UNITED STATES PATENT OFFICE.

OLIVER D. WOODRUFF, OF SOUTHINGTON, CONNECTICUT.

DOUGH MIXER AND KNEADER.

1,027,960.  Specification of Letters Patent.  Patented May 28, 1912.

Application filed December 6, 1911. Serial No. 664,178.

*To all whom it may concern:*

Be it known that I, OLIVER D. WOODRUFF, a citizen of the United States, and a resident of Southington, in the county of Hartford and State of Connecticut, have invented certain new and useful Improvements in Dough Mixers and Kneaders, of which the following is a specification.

This invention relates to dough mixers and kneaders for bread and the like and has for its object to provide a device of the class specified simple in construction and reliable and rigid in use.

The present invention is in the nature of improvements on the subject matter of Letters Patent of the United States granted me Feb. 21, 1911, Number 984728.

My present improvements may best be understood by reference to the accompanying drawing wherein I have illustrated the preferred embodiment of those improvements.

Figure 1:
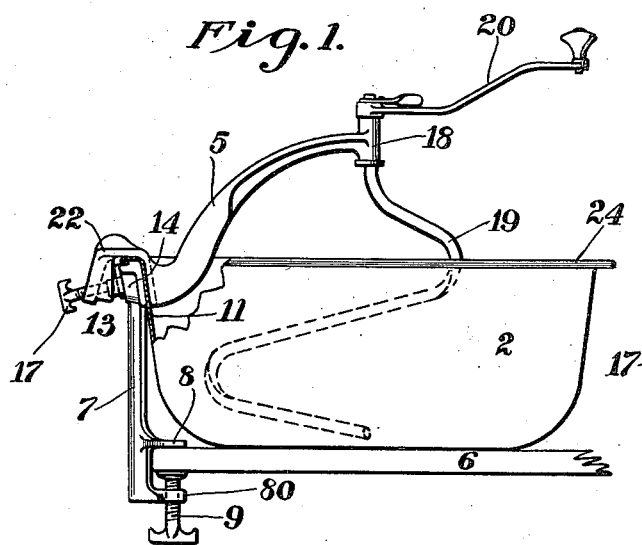
Figure 3:
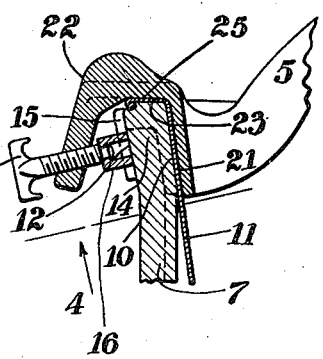
Figure 2:
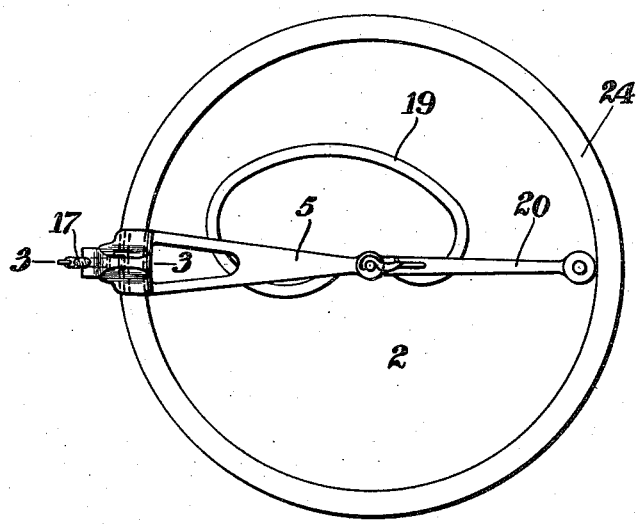
Figure 4:
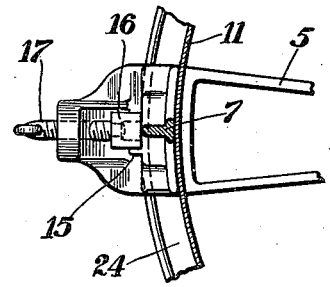

Figure 1 is a side elevation, partly in section, of a mixer and kneader in which my improvements are incorporated. Fig. 2 is a plan view of the same. Fig. 3 is an enlarged sectional elevation of a portion of Fig. 1 and the section is taken on line 3—3 of Fig. 2. Fig. 4 is a bottom view, looking in the direction of arrow 4, of what is shown in Fig. 3.

In the apparatus of the patent above referred to the whole strain of operation falls upon the receptacle or pan. A stronger pan was therefore required than would be necessary if the operative parts of the device were supported independently of the pan. In my present apparatus receptacle 2 is entirely relieved of direct strain from the operative parts of the apparatus, arm 5 being supported directly from table 6 by means of upright 7, the lower end of which is secured to said table and the upper end of which is secured to said arm, receptacle 2 being held securely between the two. Said upright 7 is provided at its lower end with clamping means comprising inreaching lip 8 for engagement with the top of table 6 and therebelow inreaching arm 80 through which is threaded winged clamp screw 9. Upper portion 14 of said upright is provided with receptacle engaging means comprising face 10, curved to match the outer face of the upper part of receptacle wall 11 and clamp engaging means comprising face 12, opposite face 10 and slightly out of parallelism therewith, the upper ends of said faces being farther apart than the lower ends thereof. Said faces thereby diverge upwardly from each other and such divergence is efficient to counteract any tendency of the clamping means, indicated in a general way at 13, Fig. 1, when loosened, to slide off upwardly from engagement with receptacle 2 and upper portion 14 of upright 7. Said upright portion 14 is also provided with projection 15 serving as a stop for swivel block 16 of clamp screw 17. Said upper portion 14 may also be provided with upper face 23 for engagement with the underside of flange 24 of receptacle 2.

Supporting arm 5 is provided at its inner end 18 with means for supporting agitating member 19. Said agitating member is illustrated as a rotor, having a bearing in said end 18 of arm 5 and it may be rotated by means of crank arm 20 affixed thereto. Said arm 5 is provided with abutment 21 for engagement with the upper portion of the inside face of wall 11 of receptacle 2 and with outreaching portion 22 overhanging said receptacle. Said portion 22 has lower face 25 for engagement with the upper face of flange 24 of receptacle 2. Near the lower end of said portion 22, winged clamp screw 17 is threaded therethrough for engagement with face 12 of upper portion 14 of upright 7. If desired the point of said screw 17 may be provided with swivel block 16 for engagement with face 12 of upright 7, and with stop 15, to relatively locate the parts. Thus, when upright 7 is clamped to table 6, receptacle 2 placed with the outer face of wall 11 in contact with face 10 of the upper portion of said upright, arm 5 placed in position with rotor 19 in receptacle 2 and face 21 in contact with the inner face of wall 11 of said receptacle, and swivel block 16 against stop 15, winged clamp screw 17 may be tightened, clamping upper portion 14 of upright 7, receptacle 2 and arm 5 securely together. The strain of operating the device is thus communicated directly to table 6 and receptacle 2 relieved of all direct strain.

I claim:—

1. A mixer and kneader including in combination, a receptacle, an agitating member therein, an arm for supporting said agitating member, an upright having table engaging means at its lower end, said upright having at its upper end a receptacle engaging face and opposite thereto a clamp engaging face, said faces diverging upwardly from each other and means on said arm engaging one diverging face of said upright for clamping said receptacle and arm together against the other diverging face of said upright.

2. A mixer and kneader including in combination, a receptacle, a rotor therein, a supporting arm for the rotor, an upright having table engaging means at its lower end, a head on said upright having two opposite faces which diverge upwardly from each other and means on said arm for clamping said upright head with one of said faces against said receptacle.

3. A mixer and kneader including in combination, a receptacle, a rotor therein, a supporting arm for the rotor, an upright having table engaging means at its lower end, said upright having at its upper end a receptacle engaging face and opposite thereto a clamp engaging face, said faces diverging upwardly from each other, means on said arm for clamping said receptacle, upright and arm together and a stop on said upright for engagement with said clamping means.

Signed at Southington, Connecticut, this 4 day of Dec., 1911, before two subscribing witnesses.

OLIVER D. WOODRUFF.

Witnesses:
JOHN HEMINGWAY,
WILLIAM M. DEGNAN.

Copies of this patent may be obtained for five cents each, by addressing the "Commissioner of Patents, Washington, D. C."